(12) United States Patent
Kim et al.

(10) Patent No.: US 9,663,687 B2
(45) Date of Patent: May 30, 2017

(54) ADHESIVE COMPOSITION, PROTECTIVE FILM FOR A POLARIZING PLATE, POLARIZING PLATE, AND LIQUID CRYSTAL DISPLAY

(75) Inventors: Se Ra Kim, Daejeon (KR); Kee Young Kim, Daejeon (KR); In Cheon Han, Seoul (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/001,778

(22) PCT Filed: Jul. 1, 2009

(86) PCT No.: PCT/KR2009/003604
§ 371 (c)(1),
(2), (4) Date: Apr. 4, 2011

(87) PCT Pub. No.: WO2010/002198
PCT Pub. Date: Jan. 7, 2010

(65) Prior Publication Data
US 2011/0177262 A1    Jul. 21, 2011

(30) Foreign Application Priority Data
Jul. 1, 2008 (KR) .................. 10-2008-0063689

(51) Int. Cl.
| C09K 19/00 | (2006.01) |
| C09J 133/08 | (2006.01) |
| C09D 133/06 | (2006.01) |
| C08G 18/62 | (2006.01) |
| C08G 18/80 | (2006.01) |
| C08F 220/18 | (2006.01) |

(52) U.S. Cl.
CPC ........ *C09J 133/08* (2013.01); *C08G 18/6254* (2013.01); *C08G 18/8029* (2013.01); *C09D 133/066* (2013.01); *C08F 2220/1825* (2013.01); *C09J 2201/606* (2013.01); *Y10T 428/1077* (2015.01); *Y10T 428/2848* (2015.01); *Y10T 428/2891* (2015.01)

(58) Field of Classification Search
CPC ............. C09J 133/08; C09J 2201/602; C09D 133/066; C09D 133/08; C09D 133/10; C08G 18/6254; Y10T 428/1059; Y10T 428/1077; Y10T 428/1082; Y10T 428/2891; Y10T 428/2848; C08F 2220/1808; C08F 2220/1825; C08F 2220/281; C08F 220/281; C08F 220/30

USPC ........ 428/1.54, 354, 355 AC; 349/117, 118, 349/119, 122; 359/489.02, 492.01, 359/489.03; 524/556
See application file for complete search history.

(56) References Cited

U.S. PATENT DOCUMENTS

| 7,285,313 B2 * | 10/2007 | Kim et al. ................ 428/1.55 |
| 2003/0054166 A1 * | 3/2003 | Chang et al. .......... 428/355 AC |
| 2005/0266239 A1 * | 12/2005 | Satake et al. ............... 428/354 |
| 2007/0243364 A1 * | 10/2007 | Maekawa et al. ........... 428/220 |
| 2009/0122236 A1 * | 5/2009 | Shutou et al. ................. 349/96 |

FOREIGN PATENT DOCUMENTS

| CN | 1404519 | 3/2003 |
| CN | 1734297 | 2/2006 |
| JP | 2003-070849 | 3/2003 |
| JP | 2004-004641 A | 1/2004 |
| JP | 2004-516359 | 6/2004 |
| JP | 2004-516359 A | 6/2004 |
| JP | 2006-047494 A | 2/2006 |
| JP | 2007-114581 A | 5/2007 |
| JP | 2007111970 A | 5/2007 |
| JP | 2008-009414 A | 1/2008 |
| JP | 2008-010650 | 1/2008 |
| JP | 2008-144125 A | 6/2008 |
| KR | 10-0431441 B1 | 5/2004 |
| TW | 1234580 | 6/2005 |
| TW | 200609546 | 3/2006 |
| TW | 200722801 | 6/2007 |
| TW | 200817179 | 4/2008 |
| TW | 200821365 | 5/2008 |
| WO | 02/50209 A1 | 6/2002 |
| WO | 03/070849 A1 | 8/2003 |
| WO | 2007/026659 A1 | 3/2007 |
| WO | WO 2007046276 A1 * | 4/2007 |
| WO | 2008/010650 A1 | 1/2008 |

OTHER PUBLICATIONS

Machine English translation of JP 2008-009414, May 9, 2012.*

* cited by examiner

*Primary Examiner* — Ruiyun Zhang
(74) *Attorney, Agent, or Firm* — Dentons US LLP

(57) ABSTRACT

The present invention relates to a pressure-sensitive adhesive composition, a protective film for polarizers, which includes a cured product of the pressure-sensitive adhesive composition, a polarizer, and a liquid crystal display (LCD). In the present invention, a pressure-sensitive adhesive showing excellent endurance reliability in high-temperature and/or high-humidity conditions and having superior physical properties such as cuttability, re-peeling property, and workability can be provided. In particular, it is possible to provide the pressure-sensitive adhesive composition which can prevent light leakage that may occur in an LCD, even when being applied to a film having a low stress optical coefficient.

17 Claims, No Drawings

ADHESIVE COMPOSITION, PROTECTIVE FILM FOR A POLARIZING PLATE, POLARIZING PLATE, AND LIQUID CRYSTAL DISPLAY

This application is a National Stage Entry of International Application No. PCT/KR2009/003604, filed Jul. 1, 2009, and claims the benefit of Korean Application No. 10-2008-0063689, filed on Jul. 1, 2008, which is hereby incorporated by reference for all purposes as if fully set forth herein.

DETAILED DESCRIPTION OF THE INVENTION

Technical Field

The present invention relates to a pressure-sensitive adhesive composition, a protective film for polarizers, a polarizer, and a liquid crystal display (LCD).

Background Art

A liquid crystal display (LCD) is a device for displaying an image on a screen by injecting liquid crystal between two glass substrates. In the LCD, if a voltage is applied through an electrode connected to liquid crystal, molecular arrangement of the liquid crystal is changed and the transmissivity of light passing through the liquid crystal is changed accordingly, thereby displaying an image. Owing to low power consumption and capability of being made thin two-dimensionally, the LCD is attracting much attention from various fields.

To manufacture the LCD, liquid crystal cells including liquid crystals and transparent substrates having electrode layers formed thereon and polarizers are required and suitable adhesives or pressure-sensitive adhesives have to be used for binding them.

The polarizer includes an iodine compound or a dichroic polarizing material aligned in a certain direction, and has a multi-layer structure in which protective films are formed on both faces.

In the multi-layer structure, a triacetyl cellulose (TAC) film has been most widely used as the protective film. However, due to poor heat resistance and moisture resistance, the TAC film, when being used for a long period of time in a high-temperature and/or high-humidity condition, undergoes polarization degree degradation, peeling from a polarizing element, or optical characteristic deterioration.

The TAC film has dimensional stability degraded by ambient environmental change, relatively large stress optical coefficient, and large amount of phase retardation change, thus significantly degrading image quality in case of long time use.

Another feature to be considered in designing an LCD is low light leakage. That is, functional films such as a phase retardation plate, a compensation plate for wide view angle, or a brightness enhancing film may be additionally attached to the polarizer. Such functional films forming the multi-layer polarizer are made of materials having different molecular structures and compositions, and so have different physical properties. In particular, under a high temperature and/or high humidity condition, the dimensional stability is insufficient according to variation in the shrinkage or expansion behavior of materials having a unidirectional molecular alignment. As a result, if the polarizer is fixed by a pressure-sensitive adhesive, then stress is concentrated under a high temperature or high temperature and humidity condition, leading to birefringence and thus light leakage.

As a representative method for solving the problem, there may be a method of optimizing designing of a pressure-sensitive adhesive for fixing the polarizer. For example, the pressure-sensitive adhesive may be designed to be soft such that it can be easily deformed by external stress, thereby giving stress relaxing property, or the pressure-sensitive adhesive may be designed to be very hard such that shrinkage of the polarizer caused by the external environment may be suppressed.

However, it is difficult to implement a pressure-sensitive adhesive satisfying physical properties such as endurance reliability, cuttability, re-peeling property, and workability at the same time, merely with techniques known so far, and most of the techniques presume the use of a TAC protective film, leading to a fundamental limitation in that the performance of a finally manufactured LCD is degraded.

Technical Problem

The present invention has been made to consider the foregoing problem, and an object thereof is to provide a pressure-sensitive adhesive composition showing excellent endurance reliability even in a severe environment, having superior physical properties such as cuttability, re-movability and workability, and being capable of efficiently suppressing light leakage when being applied to a film having a low stress optical coefficient.

Technical Solution

The present invention provides, as a means for achieving the foregoing object, a pressure-sensitive adhesive composition which satisfies a condition of General Formula 1 given below:

$$\Delta X \leq 2 \text{ nm}, \quad \text{[General Formula 1]}$$

where $\Delta X$ represents an absolute value of a phase retardation ($R_{in}$) in surface-direction, the phase retardation being measured by an equation $\{(n_x - n_y) \times d\}$ when a sheet-shaped pressure-sensitive adhesive prepared by using the pressure-sensitive adhesive composition is elongated by 500 µm in a vertical-axis direction of a sheet surface at 23° C., wherein $n_x$ represents a refractive index along a horizontal axis in a surface direction of the sheet-shaped pressure-sensitive adhesive, $n_y$ represents a refractive index along a vertical axis in the surface direction of the sheet-shaped pressure-sensitive adhesive, and d represents a thickness of the sheet-shaped pressure-sensitive adhesive.

The present invention provides, as another means for achieving the foregoing object, a protective film for polarizers, including a base film; and a pressure-sensitive adhesive layer formed on a side or both sides of the base film, the pressure-sensitive adhesive layer comprising a cured product of the pressure-sensitive adhesive composition according to the present invention.

The present invention provides, as another means for achieving the foregoing object, a polarizer including a polarizing film or polarizing element; and the protective film according to the present invention, formed on a side or both sides of the polarizing film or polarizing element.

The present invention provides, as another means for achieving the foregoing object, a liquid crystal display (LCD) comprising a liquid crystal panel in which the polarizer according to the present invention is attached on a face or both faces of a liquid crystal cell.

Effects of the Invention

In the present invention, a pressure-sensitive adhesive showing excellent durability even in a severe environment such as a high-temperature and/or a high-humidity condition and having superior physical properties such as cuttability, re-movability, and workability can be provided. In particular, it is possible to provide the pressure-sensitive adhesive composition which can prevent light leakage that may occur in an LCD, even when being applied to a film having a low stress optical coefficient.

MODE FOR CARRYING OUT THE INVENTION

The present invention relates to a pressure-sensitive adhesive composition which satisfies a condition of General Formula 1 given below:

$$\Delta X \leq 2 \text{ nm}, \quad \text{[General Formula 1]}$$

where $\Delta X$ represents an absolute value of a surface-direction phase retardation ($R_{in}$), the phase retardation being measured by an equation $\{(n_x-n_y) \times d\}$ when a sheet-shaped pressure-sensitive adhesive prepared by using the pressure-sensitive adhesive composition is elongated by 500 μm in a vertical-axis direction of a sheet surface at 23° C., wherein $n_x$ represents a refractive index along a horizontal axis in a surface direction of the sheet-shaped pressure-sensitive adhesive, $n_y$ represents a refractive index along a vertical axis in the surface direction of the sheet-shaped pressure-sensitive adhesive, and d represents a thickness of the sheet-shaped pressure-sensitive adhesive.

The pressure-sensitive adhesive composition according to the present invention can be effectively used as, for example, a pressure-sensitive adhesive composition for polarizers due to its excellent endurance reliability, workability, optical characteristics, and phase retardation characteristics.

Hereinafter, the pressure-sensitive adhesive composition according to the present invention will be described in more detail.

The pressure-sensitive adhesive composition according to the present invention is designed such that an absolute value of a phase retardation generated when a certain deformation of a pressure-sensitive adhesive occurs is within a predetermined range.

More specifically, the pressure-sensitive adhesive composition is controlled such that an absolute value of the phase retardation ($R_{in}$) in a surface direction is 2 nm or less. The phase retardation ($R_{in}$) is measured after preparing a sheet-shaped pressure-sensitive adhesive by using the pressure-sensitive adhesive composition, and then elongating the prepared adhesive at 23° C., in a vertical-axis direction on a plane of the prepared adhesive sheet by a deformation amount of about 500 μm, preferably 500 to 600 μm, more preferably 400 to 600 μm, most preferably 100 to 600 μm. In the present invention, the absolute value of the phase retardation ($R_{in}$) may be controlled to be less than preferably 1.5 nm or less, more preferably 1.0 nm or less. The term "deformation amount" used herein means a remainder left after an initial value before the elongation of the sheet-shaped pressure-sensitive adhesive is subtracted from a value after the elongation.

The phase retardation ($R_{in}$) may be measured by, for example:

$$R_{in}=(n_x-n_y) \times d, \quad \text{[General Formula 2]}$$

where $n_x$ represents a refractive index along a horizontal axis in the surface direction of the sheet-shaped pressure-sensitive adhesive, $n_y$ represents a refractive index along a vertical axis in the surface direction of the sheet-shaped pressure-sensitive adhesive, and d represents the thickness of the sheet-shaped pressure-sensitive adhesive.

Additionally, in the present invention, it is preferable for the pressure-sensitive adhesive to have an absolute value of phase retardation ($R_{th}$) in a thickness direction, which is measured in the same conditions as in the phase retardation ($R_{in}$) in surface-direction), of 2 nm or less, but it is not limited thereto.

In this case, the phase retardation ($R_{th}$) may be measured by, for example:

$$R_{th}=(n_z-n_y) \times d, \quad \text{[General Formula 3]}$$

where $n_z$ represents a refractive index in the thickness direction of the sheet-shaped pressure-sensitive adhesive, $n_y$ represents a refractive index along a vertical axis in the surface direction of the sheet-shaped pressure-sensitive adhesive, and d represents the thickness of the sheet-shaped pressure-sensitive adhesive.

By controlling the phase retardation characteristics of the pressure-sensitive adhesive within the foregoing range, it is possible to prevent the change of optical characteristics with respect to the change of environment and the occurrence of light leakage, and to excellently maintain the overall image quality of an LCD, and dimensional stability or endurance reliability in application to optical elements such as polarizers.

The composition of the pressure-sensitive adhesive composition used in the present invention is not specially limited if it has physical properties in the foregoing range. In the present invention, for example, a pressure-sensitive adhesive composition including base resin having a weight average molecular weight $M_w$ of not less than 500,000 may be used. If the weight average molecular weight $M_w$ of the base resin is less than 500,000, bubbles or peeling may occur in high temperature and/or high humidity conditions due to cohesive strength degradation, thus deteriorating endurance reliability of the pressure-sensitive adhesive. In the present invention, an upper limit of the weight average molecular weight of the base resin is not specifically limited. However, if the weight average molecular weight excessively increases, light leakage suppression performance may be degraded due to degradation of the stress relaxing property, or the coating property may be deteriorated due to viscosity increase. Therefore, the weight average molecular weight may be properly controlled within a range of 2,000,000 or less.

A detailed type of the base resin that can be used in the present invention is not specifically limited, and for example, acrylic resin, silicon resin, rubber resin, or EVA resin can be used. For application to optical elements such as an LCD, acrylic resin is generally used due to its superior transparency, anti-oxidative property, and resistance to yellowing, but the scope of the present invention is not limited thereto.

In the present invention, for example, a polymer of a monomer mixture including 80 to 99.8 parts by weight of a (meth)acrylic acid ester monomer; and 0.01 to 10 parts by weight of a crosslinking monomer may be used as the base resin.

A type of the (meth)acrylic acid ester monomer is not specifically limited, and for example, alkyl(meth)acrylate may be used. In this case, if an alkyl group included in the monomer is an excessively long chain, the cohesive strength of the pressure-sensitive adhesive is degraded and a glass transition temperature ($T_g$) or a pressure-sensitive adhesive property may become difficult to regulate. Therefore, it is desirable to use a (meth)acrylic acid ester monomer having an alkyl group of 1 to 14 carbon atoms. Examples of such a monomer include methyl(meth)acrylate, ethyl(meth)acrylate, n-propyl(meth)acrylate, isopropyl(meth)acrylate, n-butyl(meth)acrylate, t-butyl(meth)acrylate, sec-butyl(meth)acrylate, pentyl(meth)acrylate, 2-ethylhexyl(meth)acrylate, 2-ethylebutyl(meth)acrylate, n-octyl(meth)acrylate, isooctyl(meth)acrylate, isononyl(meth)acrylate, lauryl(meth)acrylate, isobonyl(meth)acrylate, and tetradecyl(meth)acrylate, and in the present invention, they can be used in a mixture of one kind or two or more kinds thereof. In the present invention, the (meth)acrylic acid ester monomer is included in the monomer mixture preferably in a content of 80 to 99.8 parts by weight relative to the content of the crosslinking monomer, or in a content of 55 to 94.9 parts by weight relative to the content of the crosslinking monomer. If the content of the (meth)acrylic acid ester monomer is less than 80 parts by weight, the initial adhesive strength may be degraded. If the content exceeds 99.8 parts by weight, a problem may occur in endurance due to cohesive strength degradation.

The crosslinking monomer included in the monomer mixture gives cohesive strength to the pressure-sensitive adhesive by reacting with a multifunctional crosslinking agent to be described later, and may give a crosslinking functional group capable of regulating a pressure-sensitive adhesive force and endurance reliability to the polymer. Examples of the crosslinking monomer may include a hydroxyl group-containing monomer, a carboxyl group-containing monomer, and a nitrogen-containing monomer. Examples of the hydroxyl group-containing monomer may include, but not limited to, 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 2-hydroxyethyleneglycol(meth)acrylate, and 2-hydroxypropyleneglycol(meth)acrylate. Examples of the carboxyl group-containing monomer may include, but not limited to, acrylic acid, methacrylic acid, 2-(meth)acryloyloxy acetic acid, 3-(meth)acryloyloxy propyl acid, 4-(meth)acryloyloxy butyl acid, acrylic acid dimer, itaconic acid, maleic acid, and maleic acid anhydride. Examples of the nitrogen-containing monomer may include, but not limited to, (meth)acrylamide, N-vinyl pyrrolidone, and N-vinylcaprolactam. In the present invention, mixtures of one kind or two or more kinds of the foregoing examples may be used.

The crosslinking monomer may be included in the monomer mixture in a content of 0.01 to 10 parts by weight relative to the content of the (meth)acrylic acid ester monomer. If the content is less than 0.01 part by weight, the endurance reliability of the pressure-sensitive adhesive may be degraded. If the content is in excess of 10 parts by weight, the pressure-sensitive adhesive property and/or peeling strength may be deteriorated.

In the present invention, the monomer mixture may further include a monomer expressed by Formula 1. Such a monomer may be added for the purpose of regulating the glass transition temperature of the pressure sensitive adhesive or giving other functions to the pressure sensitive adhesive.

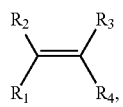

[Formula 1]

where $R_1$ to $R_3$ are, independently of each other, hydrogen or alkyl, and $R_4$ indicates cyano; phenyl substituted or unsubstituted with alkyl; acetyloxy; or $COR_6$, in which $R_5$ indicates amino or glycidyloxy substituted or unsubstituted with alkyl or alkoxyalkyl.

In the definitions of $R_1$ through $R_5$, alkyl or alkoxy may be alkyl or alkoxy of 1 to 12 carbon atoms, preferably 1 to 8 carbon atoms, and more preferably 1 to 12 carbon atoms, and more specifically, may be methyl, ethyl, methoxy, ethoxy, propoxy, or butoxy.

Detailed examples of the monomer expressed by Formula 1 may include, but not limited to, one kind or two or more kinds of a nitrogen-containing monomer such as (meth)acrylonitrile, (meth)acrylamide, N-methyl(meth)acrylamide, or N-butoxy methyl(meth)acrylamide; a styrene monomer such as styrene or methyl styrene; an epoxy group-containing monomer such as glycidyl(meth)acrylate; and a carbonic acid vinyl ester such as vinyl acetate. Such a monomer may be included in the monomer mixture in a content of less than 20 parts by weight relative to the content of the (meth)acrylic acid ester monomer or the crosslinking monomer. If the content of the monomer exceeds 20 parts by weight, the flexibility or peeling strength of the pressure-sensitive adhesive may be degraded.

In the present invention, the monomer mixture may further include an aromatic ring-containing monomer for controlling phase retardation characteristics of the pressure-sensitive adhesive. In this case, examples of the aromatic ring-containing monomer that can be used herein may include a (meth)acrylate monomer including an aromatic ring and more particularly, may be a compound given by:

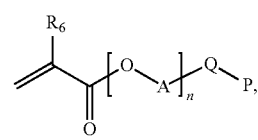

[Formula 2]

where $R_6$ indicates hydrogen or alkyl, A indicates alkylene, n indicates an integer of 0 to 3, Q indicates a single bond, —O—, —S—, or alkylene, and P indicates a substituted or unsubstituted aromatic ring.

In the definition of Formula 2, "single bond" means the case in which two atom groups presented at both sides of the "Q" are directly bonded.

In the definition of Formula 2, $R_6$ may be preferably hydrogen or alkyl of 1 to 4 carbon atoms, and more preferably, hydrogen, methyl, or ethyl.

In the definition of Formula 2, A may be alkylene of 1 to 12 carbon atoms, preferably alkylene of 1 to 8 carbon atoms, and more preferably methylene, ethylene, hexylene, or octylene.

In the definition of Formula 2, n may be an integer of preferably 0 to 2, and more preferably 0 or 1.

In the definition of Formula 2, Q may be preferably a single bond, —O— or —S—.

In the definition of Formula 2, P is a substituent derived from an aromatic compound and may be preferably an aromatic ring of 6 to 20 carbon atoms, more preferably phenyl, biphenyl, naphthyl, or anthracenyl, and more preferably phenyl.

In the compound expressed by Formula 2, the aromatic ring may have been arbitrarily substituted with one or more substituents and detailed examples of the substituent may include, but not limited to, halogen or alkyl, preferably halogen or alkyl of 1 to 12 carbon atoms, and more preferably chlorine, brome, methyl, ethyl, propyl, butyl, nonyl, or dodecyl.

Detailed examples of the compound expressed by Formula 2 may include, but not limited to, mixtures of one kind or two or more kinds of phenoxy ethyl(meth)acrylate, benzyl(meth)acrylate, 2-phenylthio-1-ethyl(meth)acrylate, 6-(4,6-dibromo-2-isopropylphenoxy)-1-hexyl(meth)acrylate, 6-(4,6-dibromo-2-sec-butyl phenoxy)-1-hexyl(meth)acrylate, 2,6-dibromo-4-nonylphenyl(meth)acrylate, 2,6-dibromo-4-dodecylphenyl(meth)acrylate, 2-(1-naphthyloxy)-1-ethyl(meth)acrylate, 2-(2-naphthyloxy)-1-ethyl(meth)acrylate, 6-(1-naphthyloxy)-1-hexyl(meth)acrylate, 6-(2-naphthyloxy)-1-hexyl(meth)acrylate, 8-(1-naphthyloxy)-1-octyl(meth)acrylate, and 8-(2-naphthyloxy)-1-octyl(meth)acrylate, and preferably mixtures of one kind or two or more kinds of phenoxy ethyl(meth)acrylate, benzyl(meth)acrylate 2-phenylthio-1-ethyl acrylate, 8-(2-naphthyloxy)-1-octyl acrylate, and 2-(1-naphthyloxy)-ethyl acrylate, and more preferably mixtures of one kind or two or more kinds of phenoxy ethyl(meth)acrylate and benzyl(meth)acrylate.

The aromatic ring-containing monomer may be included in the monomer mixture in a content of not more than 15 parts by weight relative to the content of the (meth)acrylic acid ester monomer or the crosslinking monomer. If the content of the aromatic ring-containing monomer exceeds 15 parts by weight, light leakage suppressing effect may be degraded or phase retardation characteristics may become difficult to control.

In the present invention, a method of preparing the polymer by using the monomer mixture is not specifically limited, and for example, the polymer may be prepared by using a general polymerization method such as solution polymerization, photo-polymerization, bulk polymerization, suspension polymerization, and emulsion polymerization. In the present invention, it is desirable to use solution polymerization and solution polymerization is preferably performed by mixing an initiator in a state where monomers are evenly mixed at a polymerization temperature of 50 to 140° C. The initiator that can be used herein may be an azo-based polymerization initiator such as azo-bisisobutyronitrile or azobiscyclohexane carbonitrile; and/or a common initiator like peroxide such as benzoyl peroxide or acetyl peroxide.

The pressure-sensitive adhesive composition according to the present invention may further include a compound having a positive stress optical coefficient to control phase retardation characteristics, and such a compound may be simply blended in the pressure-sensitive adhesive composition or may be included as a multilayer structure in the pressure-sensitive adhesive.

Examples of the compound having a positive stress optical coefficient may include, but not limited to, a compound having an asymmetric molecular structure, and a positive stress optical coefficient in a major-axis direction, the compound having an asymmetric structure along an axis direction; and a compound having a substituent (e.g., alkyl, alkenyl, and/or alkynyl-containing substituents) in a meta position of mesogen. Examples of the compound may include an aromatic compound and an alicyclic compound. Examples of the aromatic compound may include, but not limited to, an aromatic liquid crystalline compound such as an aromatic crystalline compound, a cholesteric compound, and a smetic compound.

A more detailed example of the compound having a positive stress optical coefficient according to the present invention may be a compound given by:

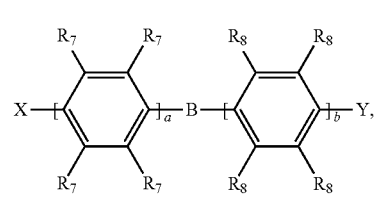

[Formula 3]

where B represents a single bond, —CH=N—, —N=N—, —N=N(O)—, —COO—, —CH$_2$O—, —C(R$_7$)$_2$—CO—, —COO—CH$_2$—, —CH=CH—, —C≡C—, —S—, —SO$_2$—, -ϕ(R$_7$)—, —CH=N-ϕ(R$_7$)—N=CH—, —CH=CH-ϕ(R$_7$)—N=CH—, —CH=CH-ϕ(R$_7$)—CH=CH—, —CH=CH-ϕ(R$_7$)-ϕ(R$_8$)—CH=CH—, —CH=N-ϕ(R$_7$)—(R$_8$)—N=CH—, —CH=N-ϕ(R$_7$)-ϕ(R$_8$)—CH=CH—, —N=N-ϕ(R$_7$)—N=CH—, —C(=O)—O-ϕ(R$_7$)—C(CH$_3$)$_2$—, a naphthalene core, or an anthracen code, X, Y, R$_7$, and R$_8$ represent, independently of one another, hydrogen, halogen, cyano, amino, hydroxy, alkyl, alkoxy, aryl, dialkylamine, and cumyl, a represents an integer of 0 to 3, and b represents an integer of 1 to 3 when a is 0, and an integer of 0 to 3 when a is an integer of 1 to 3.

In the definition of Formula 3, the term "single bond" means the case in which two aromatic groups presented at both sides of the "B" are directly bonded, and in this case, the "direct bond" may include, for example, a case where two carbon atoms in one aromatic group and two carbon atoms in the other aromatic group are bonded to each other like naphthalene or anthracen as well as a case where one carbon atom in one aromatic group and one carbon atoms in the other aromatic group are directly bonded like biphenyl.

In the definition of Formula 3, -ϕ- represents an aromatic core, preferably a benzene core.

In the definition of Formula 3, X or Y may be, independently of each other, preferably hydrogen, cyano, alkyl of 1 to 12 carbon atoms, or alkoxy of 1 to 12 carbon atoms, more preferably hydrogen, cyano, ethyl, pentyl, hexyl, octyl, methoxy, ethoxy, or pentoxy.

In addition, in the definition of Formula 3, R$_7$ and R$_8$ represent, independently of each other, hydrogen, alkyl of 1 to 12 carbon atoms, or alkoxy of 1 to 12 carbon atoms, more specifically, hydrogen, cyano, ethyl, pentyl, hexyl, octyl, or pentoxy.

In the definition of Formula 3, preferably, a and b are 1, or a is 0 and b is 1.

In the definition of Formula 3, B may be preferably a single bond, —N=N—, —CH=CH—, —C≡C—, —(C$_6$H$_4$)—, —CH=CH—(C$_6$H$_4$)—N=CH—, —N=N-ϕ(R$_7$)—N=CH—, —C(=O)—O-ϕ(R$_7$)—C(CH$_3$)$_2$—, or a naphthalene core.

More detailed examples of the compound expressed by Formula 3 include, but not limited to one kind or two or more kinds of biphenyl, transstylbene, azobenzene, p-terphenyl, m-terphenyl, cumylphenyl benzoate, diphenylacetylene, 4-ethylbiphenyl, 4'-pentyl-4-biphenylcarbonitrile, 4-biphenylcarbonitrile, 4'-pentylbiphenyl, 4'-pentoxy-4-biphenylcarbonitrile, 4'-hexyl-4-biphenylcarbonitrile, 4'-octyl-4-biphenylcarbonitrile, trans-4-octyl-4'-ethoxy stilbene, naphthalene, anthracene, 4'-methoxy benzylideneaminostilbene, 4'-methoxy benzylideneaminostilbene, and derives of the compound. That is, in the present invention, a detailed type of the compound is not specially limited if it has compatibility with the base resin and shows a positive stress optical coefficient with an asymmetric electron structure in its molecular structure.

Another example of the compound having a positive stress optical coefficient that can be used herein may be a compound given by:

[Formula 4]

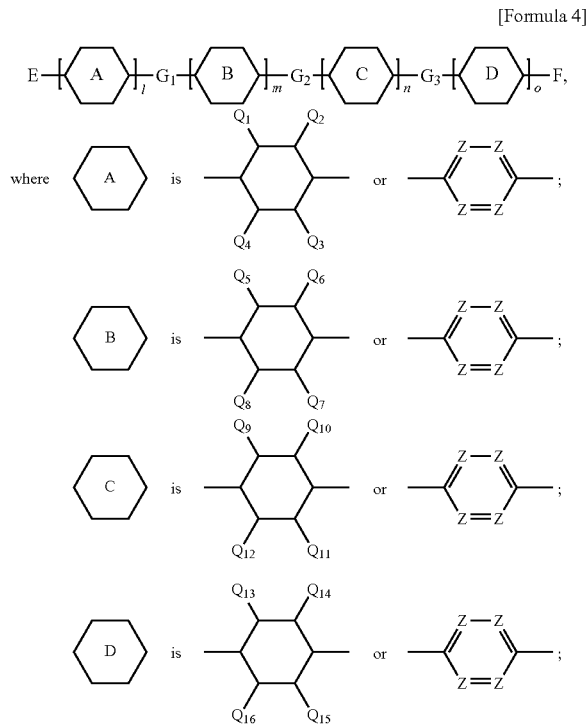

Z is C—W or N;

$Q_1$ to $Q_{16}$ and W are, independently of one another, hydrogen, halogen, cyano, perfluoroalkyl, perfluoroalkyloxy, —$R_9$, —$OR_9$, —$NHR_9$, —$N(R_9)_2$, —C(=O)$R_9$, —$SR_9$, —$SOR_9$, —$SO_2R_9$, —C(=O)$NR_9$, —$NR_9$C(=O)$R_9$, —C(=O)$OR_9$, —OC(=O)$R_9$, or —OC(=O)$OR_9$;

$R_9$ is hydrogen, alkyl, alkenyl, alkynyl, or —($R_{10}O)_qR_{11}$, $R_{10}$ is alkylene, $R_{11}$ is alkyl, and q is an integer of 1 to 5;

l, m, n, and o are, independently of one another, an integer of 0 to 2, and l+m+n+o is an integer greater than 2;

E and F are, independently of each another, hydrogen, halogen, cyano, —$R_9$, —$OR_9$, —$NHR_9$, —$N(R_9)_2$, —NCO, —NCS, —C(=O)$R_9$, or —Si($R_9)_3$; and $G_1$, $G_2$, and $G_3$ are, independently of one another, a single bond, —O—, —$R_{10}$O—, —$NR_{10}$—, —S—, —SO—, —$SO_2$—, alkylene, alkenylene, alkynylene, or —U-T-V—, U and T are, independently of each another, a single bond, —S—, —$NR_{10}$—, —O(CH$_2$)$_p$—, carbonyl or —O—, V is a single bond, —O—, carbonyl, —$NR_{10}$—, —S—, —(CH$_2$)$_p$—, —O(CH$_2$)$_p$—, or —(CH$_2$)$_p$O—, and p is an integer of 0 to 5.

The compound expressed by Formula 4 is an optically anisotropic compound having a mesogen core in its molecular structure. As used herein, "mesogen" is a component which is included in a liquid crystal compound and forms a rigid part. In the present invention, the term "mesogen" may mean, for example, a core structure in which two or more benzene rings are connected. The two or more benzene rings may be directly connected to each other or may be connected via another atom or atom group. As used herein, the benzene ring is a concept including benzene and derivatives thereof. In the present invention, the mesogen core may mean, preferably, a structure including three or more core structures selected from biphenyl, toluene, and a benzene ring. The mesogen core may align the compound in a particular direction with respect to an external stimulus such as shrinkage of a polarizer and may cause the compound to show positive birefringence on the whole. Thus, the compound expressed by Formula 4 can optically compensate for negative birefringence generated due to, for example, shrinkage of a polarizer.

In the definition of Formula 4, alkyl or alkylene may be alkyl or alkylene of 1 to 20 carbon atoms, 1 to 16 carbon atoms, 1 to 12 carbon atoms, 1 to 8 carbon atoms, or 1 to 4 carbon atoms, and alkenyl, alkenylene, alkynyl or alkynylene may be alkenyl, alkenylene, alkynyl or alkynylene of 2 to 20 carbon atoms, 2 to 16 carbon atoms, 2 to 12 carbon atoms, 2 to 8 carbon atoms, or 2 to 4 carbon atoms.

In the definition of Formula 4, alkyl, alkylene, alkenyl, alkenylene, alkynyl or alkynylene may be substituted with hydroxy; cyano; halogen, preferably chlorine or bromine; alkyl of 1 to 12 carbon atoms, preferably 1 to 8 carbon atoms, and more preferably 1 to 4 carbon atoms; alkoxy of 1 to 12 carbon atoms, preferably 1 to 8 carbon atoms, and more preferably 1 to 4 carbon atoms; alkynyl of 2 to 12 carbon atoms, preferably 2 to 8 carbon atoms, and more preferably 2 to 4 carbon atoms; or alkenyl of 2 to 12 carbon atoms, preferably 2 to 8 carbon atoms, and more preferably 2 to 4 carbon atoms.

In the definition of Formula 4, "single bond" means that two atom groups are directly bonded without using a separate atom as a medium.

In the definition of Formula 4, preferably, l, m, and o are 1 and n is 0, or l and o are 1 and m and n are 0.

In the definition of Formula 4, E and F may preferably be hydrogen, cyano, or silyl substituted with alkyl of 1 to 8 carbon atoms, alkoxy of 1 to 8 carbon atoms, or an alkyl group of 1 to 8 carbon atoms, and more preferably, may be hydrogen, cyano, ethyl, propyl, isopropyl, pentyl, hexyl, ethoxy, propoxy, pentoxy, hexyloxy, trimethyl silyl, trihexyl silyl, or hexyl dimethyl silyl, more preferably, hydrogen, cyano, propyl, hexyl, or hexyl dimethyl silyl.

In the definition of Formula 4,

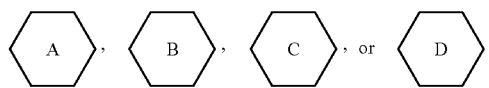

may be preferably

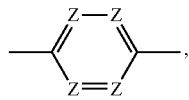

in which Z is C—W or N, W is hydrogen, $R_9$ or —$OR_9$, and $R_9$ may be alkyl of 1 to 12 carbon atoms or alkenyl of 2 to 12 carbon atoms.

In the definition of Formula 4, $G_1$ may be alkylene of 1 to 4 carbon atoms, alkenylene of 2 to 4 carbon atoms, alkynylene of 2 to 4 carbon atoms, —S—, —$SO_2$—, —SO—, CO—, —OC(=O)— or —C(=O)—O—, and more preferably, may be ethenylene, propenylene, ethynylene or prothienylene, —S—, —$SO_2$—, —SO—, CO—, —C(=O)—O— or —O—C(=O)—.

In the definition of Formula 4, $G_2$ and $G_3$ may preferably be, independently of each other, a single bond, alkenylene of 1 to 4 carbon atoms or alkylene of 1 to 4 carbon atoms, and more preferably, may be, independently of each other, a single bond, ethenylene, propenylene, ethynylene or prothienylene.

In the compound expressed by Formula 4, more preferably, l, m, and o are 1 and n is 0, or l and o are 1 and m and n are 0, E and F are hydrogen, cyano, ethyl, propyl, isopropyl, pentyl, hexyl, ethoxy, propoxy, pentoxy, hexyloxy, trimethyl silyl, trihexyl silyl, or hexyl dimethyl silyl,

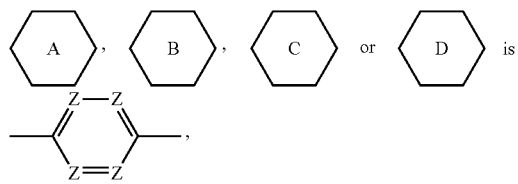

Z is C—W or N and W is hydrogen, —$R_9$ or —$OR_9$, $R_9$ is alkyl of 1 to 12 carbon atoms or alkenyl of 2 to 12 carbon atoms, $G_1$ is ethenylene, propenylene, ethynylene or prothienylene, —S—, —$SO_2$—, —SO—, CO—, —C(=O)—O—, or —O—C(=O)—, $G_2$ and $G_3$ are, independently of each other, a single bond, ethenylene, propenylene, ethynylene, or prothynylene.

In the compound expressed by Formula 4, more preferably, l, m, and o are 1 and n is 0, or l and o are 1 and m and n are 0, E and F are hydrogen, cyano, ethyl, propyl, isopropyl, pentyl, hexyl, ethoxy, propoxy, pentoxy, hexyloxy, trimethyl silyl, trihexyl silyl, or hexyl dimethyl silyl,

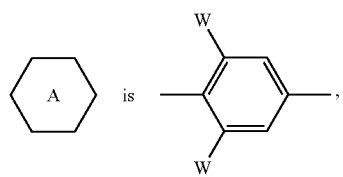

where W is hydrogen, —$R_9$, or —$OR_9$, and $R_9$ is alkyl of 1 to 12 carbon atoms or alkenyl of 2 to 12 carbon atoms,

are, independently of one another,

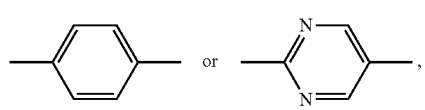

$G_1$ is preferably ethenylene, propenylene, ethynylene or prothienylene, —S—, —$SO_2$—, —SO—, CO—, —C(=O)—O—, or —O—C(=O)—, $G_2$ and $G_3$ are, independently of each other, a single bond, ethenylene, propenylene, ethynylene, or prothynylene.

In the present invention, the optically anisotropic compound preferably has one or more substituents in a meta position of the mesogen. The term "meta position of the mesogen" means one or more meta positions of benzene rings forming the mesogen core, and preferably means a meta position of a benzene ring existed at the end of the mesogen core. If one or more substituents are provided in the meta position of the mesogen, the physical property of the optically anisotropic compound, such as compatibility with pressure-sensitive adhesive resin, may be improved and thus the effect obtained by addition of the optically anisotropic compound can be further enhanced. A type of the substituent existing in the meta position of the mesogen is not specifically limited, and one or more selected from a group consisting of alkyl, alkenyl, and alkynyl may be included.

In this case, in the definition of Formula 4,

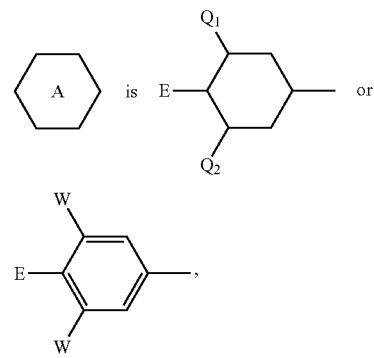

and in this case, E is hydrogen; and/or

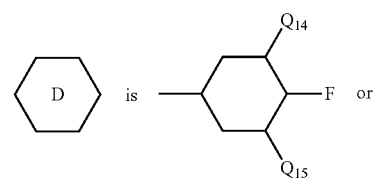

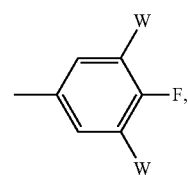

and in this case, F may be hydrogen.

$Q_1$, $Q_2$, $Q_{14}$, $Q_{15}$, and W may be, independently of one another, the aforementioned substituents or a preferable one thereof, and more preferably, may be a substituent including alkyl, alkenyl or alkynyl among the substituents.

More preferably, the compound expressed by Formula 4 may be one or more among compounds expressed by Formulas 5 to 25.

[Formula 5]
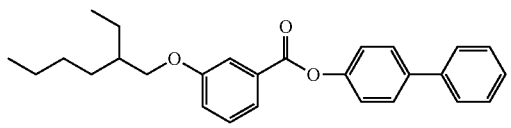
[Formula 6]
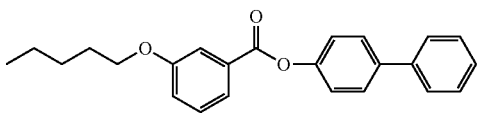
[Formula 7]
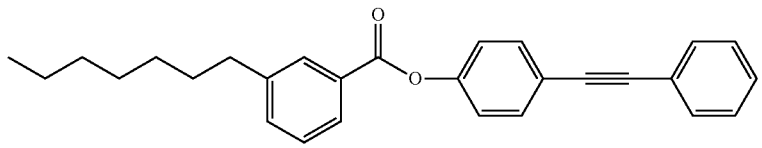
[Formula 8]
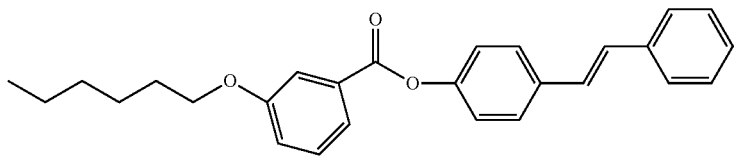
[Formula 9]
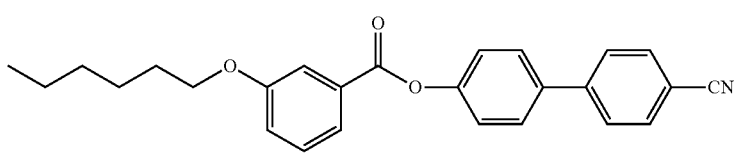
[Formula 10]
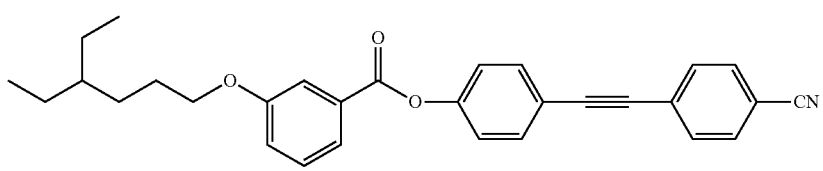
[Formula 11]
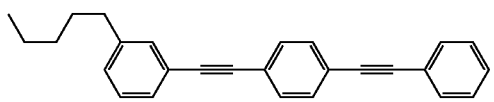
[Formula 12]
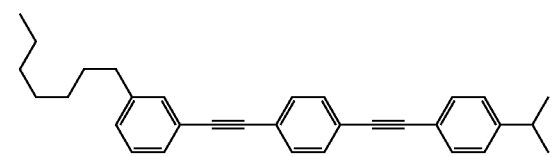
[Formula 13]
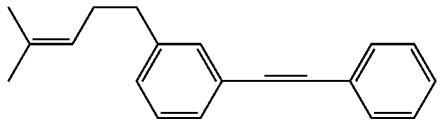
[Formula 14]
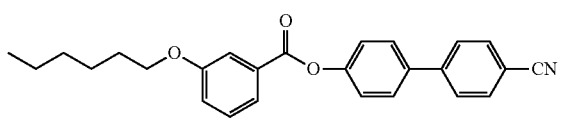
[Formula 15]
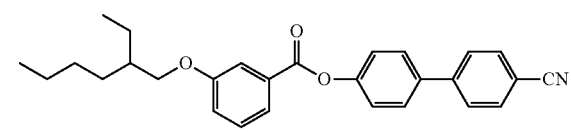
[Formula 16]
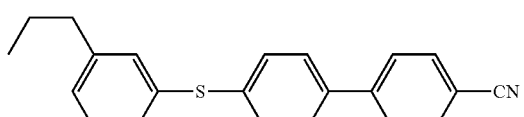
[Formula 17]
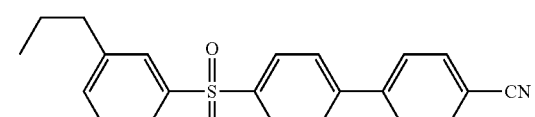
[Formula 18]
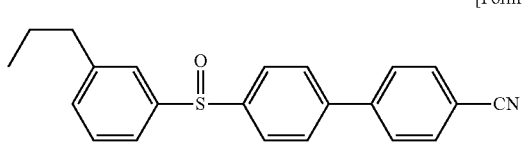
[Formula 19]
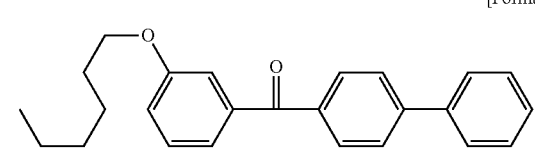
[Formula 20]

[Formula 21]
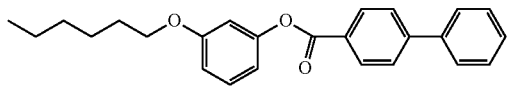

[Formula 22]
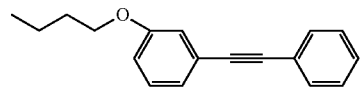

[Formula 23]
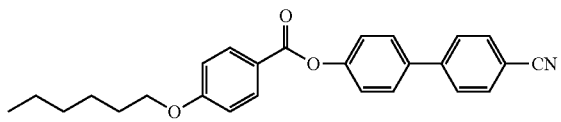

[Formula 24]
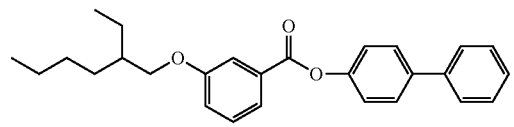

[Formula 25]

If the compound having a positive stress optical coefficient is included in the pressure-sensitive adhesive composition according to the present invention, the content thereof is preferably not more than 15 parts by weight relative to 100 parts by weight of the base resin. If the content is in excess of 15 parts by weight, light leakage property is degraded or phase retardation characteristics may become difficult to regulate.

The pressure-sensitive adhesive composition according to the present invention may further include 0.1 to 10 parts by weight of a crosslinking agent relative to 100 parts by weight of the base resin. The crosslinking agent may add cohesive strength to the pressure-sensitive adhesive through crosslinking reaction with the base resin.

A detailed type of the crosslinking agent used herein is not particularly limited, and for example, a general crosslinking agent such as an isocyanate compound, an epoxy compound, an aziridine compound, or a metal chelate compound may be used.

A detailed example of the isocyanate compound may be, but not limited to, one or more selected from a group consisting of tolylene diisocyanate, xylene diisocyanate, diphenylmethane diisocyanate, hexamethylene diisocyanate, isophorone diisocyanate, tetramethylxylene diisocyanate, naphthalene diisocyanate, and reaction product between at least one of the forgoing isocyanate compounds and polyol such as trimethylolpropane. A detailed example of the epoxy compound may be, but not limited to, one or more selected from a group consisting of ethyleneglycol diglycidylether, triglycidylether, trimethylolpropane triglycidylether, N,N,N',N'-tetraglycidylethylene diamine, and glycerine diglycidylether. A detailed example of the aziridine compound may be, but not limited to, one or more selected from a group consisting of N,N'-toluene-2,4-bis(1-aziridinecarboxamide), N,N'-diphenylmethane-4,4'-bis(1-aziridinecarboxamide), triethylene melamine, bisisoprothaloyl-1-(2-methylaziridine), and tri-1-aziridinylphosphineoxide. A detailed example of the metal chelate compound may be, but not limited to, one or more selected from a group consisting of compounds prepared by coordinating multivalent metal such as Al, Fe, Zn, Sn, Ti, Sb, Mg, or V with acethylacetone or ethyl acetoacetate. However, the present invention is not limited to the foregoing examples.

The crosslinking agent is included preferably in a content of 0.1 to 10 parts by weight relative to 100 parts by weight of the base resin. If the content is less than 0.1 part by weight, the cohesive strength of the pressure-sensitive adhesive may be degraded. If the content exceeds 10 parts by weight, interlayer peeling or lifting may occur, deteriorating endurance reliability.

The pressure-sensitive adhesive composition according to the present invention may further include 0.01 to 10 parts by weight of a silane coupling agent relative to 100 parts by weight of the base resin. When the pressure-sensitive adhesive is left for a long period of time in a high-temperature or high-humidity condition, the silane coupling agent can contribute to improvement of adhesion reliability, and especially improve adhesion stability in adhesion to a glass substrate, thereby enhancing heat resistance and moisture resistance. Examples of the silane coupling agent that can be used herein may include, but not limited to, mixtures of one kind or two or more kinds of γ-glycydoxy propyltrimethoxysilane, γ-glycydoxy propylmethyldiethoxysilane, γ-glycydoxy propyltriethoxysilane, 3-mercaptopropyltrimethoxysilane, vinyltrimethoxysilane, vinyltriethoxysilane, γ-methacryloxypropyltrimethoxysilane, γ-methacryloxypropyltriethoxysilane, γ-aminopropyltriethoxysilane, 3-isocyanatepropyltriethoxysilane, γ-acetoacetatepropyltrimethoxysilane, and the like.

The silane coupling agent is included in a content of preferably 0.01 to 10 parts by weight, more preferably 0.05 to 1 part by weight relative to 100 parts by weight of the base resin. If the content is less than 0.01 part by weight, the pressure-sensitive adhesive strength improving effect would not be sufficient. If the content exceeds 10 parts by weight, bubbles are generated or peeling may occur, degrading endurance reliability.

The pressure-sensitive adhesive composition according to the present invention may further include 1 to 100 parts by weight of tackifier resin relative to 100 parts by weight of the base resin to regulate pressure-sensitive adhesive performance. A type of the tackifier resin is not specially limited and may be, for example, a mixture of one kind or two or more kinds of (hydrogenated) hydrocarbon resin, (hydrogenated) rosin resin, (hydrogenated) rosin ester resin, (hydrogenated) terpene resin, (hydrogenated) terpene phenol resin, polymerized rosin resin, polymerized rosin ester resin, and the like. If the content of the tackifier resin is less than 1 part by weight, the effect of adding the tackifier resin is insufficient. If the content is in excess of 100 parts by weight, the effect of improving compatibility and/or cohesive strength may be degraded.

In a range that does not have an influence upon the effect of the present invention, the pressure-sensitive adhesive composition according to the present invention may further include one or more additives selected from a group consisting of an initiator such as a heat initiator or a photo initiator; epoxy resin; a curing agent; a ultraviolet (UV) stabilizer; an antioxidant; a coloring agent; a reinforcing agent; an antifoaming agent; a surfactant; a photopolymerizing compound such as multifunctional acrylate; and a plasticizer.

The present invention also relates to a protective film for polarizers, comprising: a base film; and a pressure-sensitive adhesive layer formed on a side or both sides of the base film, the pressure-sensitive adhesive layer comprising a cured product of the pressure-sensitive adhesive composition according to the present invention.

In the protective film according to the present invention, it is desirable to use a film having an absolute value of a stress optical coefficient of 10 brewster or less, preferably 6 brewster or less, more preferably 3 brewster or less as a base film. The "brewster" means $10^{-12}$ m$^2$/N.

The term "stress optical coefficient" as used herein means a ratio of stress applied to a test piece (e.g., a base film) and birefringence caused by the stress. If a stress $\Delta F$ is generated by applying an external force to an isotropic solid, the isotropic solid shows optical anisotropy resulting in birefringence $\Delta n$. In this case, a ratio of the stress and the birefringence $\Delta n/\Delta F$ is defined as a stress optical coefficient. If the stress optical coefficient of the base film used in the present invention is out of the foregoing range, the change of optical characteristics may largely occur according to the change of outer environment, resulting in deteriorating overall image quality.

A detailed type of the base film used in the present invention is not specifically limited if it shows the foregoing optical characteristics, and for example, it may be a polycarbonate film; a saturated cycloolefine film, an olefine thermoplastic resin film having a substituted or unsubstituted imide group in its side chain; a thermoplastic resin film having a substituted or unsubstituted phenyl group and nitrile group in its side chain; or an acrylic film.

In the present invention, an acrylic film may be used in a sense that it shows good physical features such as heat resistance and moisture resistance and can prevent problems such as polarization degree degradation, peeling from a polarizing element, or optical characteristic deterioration. Due to its superior heat resistance, transparency, and other optical physical features, the acrylic film can exhibit excellent performance when being applied to optical elements such as polarizers. A detailed type of the acrylic film may include, but not limited to, a film including acrylic base resin and a toughness improving agent (e.g., an anti-shock acrylic rubber-methylmethacrylate graft copolymer, butyl modified acetyl cellulose, and the like); or a film prepared by mixing acrylic base resin with soft acrylic resin, acryl rubber and/or rubber-acrylic graft polymer.

In the present invention, it is desirable to use a film including acrylic base resin; and a graft copolymer comprising conjugated diene rubber and acrylic resin. A detailed example of the acrylic base resin may be one kind or two or more kinds of a copolymer of an acrylic monomer, an aromatic vinyl monomer, and an acrylonitrile monomer; a copolymer of an acrylic monomer, an aromatic vinyl monomer, and an acid anhydride; and a copolymer of an acrylic monomer, an aromatic vinyl monomer, an acrylonitrile monomer, and an acid anhydride. The acrylic base resin may further include, as an additional comonomer, (meth)acrylic acid (e.g., (meth)acrylic acid or a derive thereof) and/or an imide monomer (e.g., phenyl maleimide or cyclohexyl maleimide).

In the present invention, a detailed type of the acrylic monomer forming the acrylic base resin is not particularly limited if it is a compound including an ester group, a carbonyl group, and a double bond between conjugated carbons. The included substituents are not also particularly limited. In the present invention, for example, a compound expressed by Formula 26 may be used as the acrylic monomer.

[Formula 26]

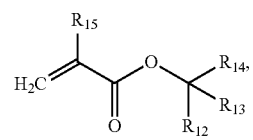

where $R_{12}$, $R_{13}$, and $R_{14}$ indicate, independently of one another, hydrogen, an epoxy group, or a unifunctional hydrocarbon group including hetero atoms, and one or more of $R_{12}$, $R_{13}$, and $R_{14}$ may be an epoxy group; and $R_{15}$ indicates hydrogen or an alkyl group.

In the definition of Formula 26, the unifunctional hydrocarbon group may be a hydrocarbon group of preferably 1 to 30 carbon atoms, more preferably 1 to 20 carbon atoms, more preferably 1 to 12 carbon atoms, and most preferably may be an alkyl group of 1 to 8 carbon atoms. More specifically, the unifunctional hydrocarbon group may be, but not limited to, methyl, ethyl, propyl, or butyl.

In Formula 26, alkyl may be an alkyl of 1 to 12 carbon atoms, preferably 1 to 8 carbon atoms, more preferably 1 to 4 carbon atoms. More specifically, alkyl may be methyl or ethyl.

A detailed example of the acrylic monomer expressed by Formula 26 may include, but not limited to, one or more kind selected from a group consisting of methyl(meth)acrylate, ethyl(meth)acrylate, methyl ethacrylate, and ethylethacrylate, and more preferably may be methyl(meth)acrylate.

In the present invention, the aromatic vinyl monomer forming the acrylic base resin may be preferably a compound having a structure in which a benzene core is substituted or unsubstituted with one or more alkyl groups (e.g., an alkyl group of 1 to 5 carbon atoms) or a halogen group (e.g., brome or chlorine), and a detailed example thereof may be a styrene monomer such as styrene and/or α-methylstyrene.

In the present invention, a detailed example of the acrylonitrile monomer forming the acrylic base resin may be a mixture of one kind or two or more kinds of (meth)acrylonitrile and ethacrylonitrile.

In the present invention, an example of the acid anhydride forming the acrylic base resin may be a carboxyl acid anhydride or a multifunctional carboxyl acid anhydride higher than unifunctional or bifunctional.

More specifically, an example of the acid anhydride includes a compound given by:

[Formula 27]

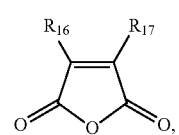

where $R_{16}$ and $R_{17}$ indicate, independently of each other, hydrogen or an alkyl group (preferably an alkyl group of 1 to 4 carbon atoms).

In the present invention, when the copolymer of the acrylic monomer, the aromatic vinyl monomer, and the acrylonitrile monomer; the copolymer of the acrylic monomer, the aromatic vinyl monomer, the acid anhydride; or the copolymer of the acrylic monomer, the aromatic vinyl monomer, the acrylonitrile monomer, and the acid anhydride is used as the acrylic base resin, the contents in a monomer mixture are preferably, but not limited to, 55 to 80 parts by weight of the acrylic monomer; 10 to 35 parts by weight of the aromatic vinyl monomer; and 4 to 15 parts by weight of the acrylonitrile monomer and/or the acid anhydride.

In the present invention, the graft copolymer of conjugated diene rubber and acrylic resin preferably has a core-cell structure in which the conjugated diene rubber forms a core part and the acrylic resin forms a shell part. In this case, in the graft copolymer, an average diameter of the core part may be, but not limited to, for example, 150 to 400 nm, preferably 200 to 300 nm. Since a film material sued for an LCD needs high stability against UV and heat resistance, it is not desirable to a large amount of conjugated diene compound including a double bond in molecules. However, when conjugated diene rubber having the foregoing distinctive structure is used, it is possible to solve stability and heat resistance degradation problems of the film while improving film toughness by including the rubber component.

An example of the conjugated diene rubber of the core part that can be included in the graft copolymer may be ethylene-propylene diene rubber and/or butadiene rubber.

A type of the acrylic resin forming the shell part in the graft copolymer is not specifically limited, and for example, may be resin having a similar or the same composition as the acrylic base resin.

In the present invention, the graft copolymer preferably includes 10 to 50 parts by weight of the conjugated diene rubber forming the core part and 90 to 50 parts by weight of the acrylic resin forming the shell part, more preferably 15 to 45 parts by weight of the conjugated diene rubber and 85 to 55 parts by weight of the acrylic resin. If the content of the diene rubber is less than 10 parts by weight or the content of the acrylic resin exceeds 90 parts by weight, the film toughness may be degraded. If the content of the diene rubber exceeds 50 parts by weight or the content of the acrylic resin is less than 50 parts by weight, there may occur problems such as distribution degradation, excessive increase of haze or thermal expansion coefficients, or glass transition temperature degradation.

A method of preparing the graft polymer is not specially limited, and a general graft polymerization method such as a common emulsion polymerization method may be used. In this case, a graft rate may be 30 to 60%.

In the film including the foregoing components, the conjugate diene rubber may be included preferably in a content of 20 to 65 parts by weight relative to 100 parts by weight of the acrylic base resin. If the content is less than 20 parts by weight, the film toughness may be degraded. If the content exceeds 65 parts by weight, problems may occur such as film workability degradation, haze increase, or glass transition temperature degradation.

In the present invention, as the base film, a polycarbonate film; a saturated cycloolefin film; or a film including olefin thermoplastic resin having a substituted or unsubstituted amide group in a side chain and thermoplastic resin having a substituted or unsubstituted phenyl group and nitrile groups in a side chain may be used.

The base film according to the present invention may further include one or more additives selected from a group consisting of a plasticizer, a lubricant, a shock-releasing agent, a stabilizer, and an UV absorber. The UV absorber is preferably included to protect optical elements from external UV. An example of the UV absorber that can be used may be a benzotriazol compound or triazine compound, or a hindered amine light stabilizer such as bis(2,2,6,6-tetramethyl-4-piperidyl)sebaceate) may be used. The base film according to the present invention may properly include a phase retardation reducing agent such as a styrene-containing polymer (e.g., an acrylonitride-styrene copolymer).

The base film may be prepared by, for example, blending the foregoing raw composition with a well-known mixer (e.g., an Omni mixer), extruding and mixing the obtained mixture with a well-known mixer (e.g., an extruder such as a single-axis extruder or a two-axis extruder, or a pressing kneader, and then performing well-known molding (e.g., solution casting, melt extrusion, calendaring, or compression molding). In particular, it is desirable to use solution casting or melt extrusion for the preparation.

The thickness of the base film can be properly selected according to the application of the base film without being specifically limited, and for example, it may be 20 to 200 μm, preferably 40 to 120 μm. In addition, the base film may be a non-elongated or elongated film, and the elongated film may be a single-axis elongated film or a two-axis elongated film, in which the two-axis elongated film may be a simultaneous two-axis elongated film or a sequential 2-axis elongated film. The base film according to the present invention has, but not limited to, a glass transition temperature of preferably 110 to 130° C., a thermal deformation temperature of preferably 110 to 140° C., and a melt index (220° C., and 10 Kg) of 2 to 6.

A method of forming a pressure-sensitive adhesive layer on the polarizing film or polarizing element is not specially limited. For example, the method may include applying the pressure-sensitive adhesive composition to the film with a general means such as a bar coater, drying and then aging it, or applying the pressure-sensitive adhesive to the peeling base surface, drying it, transferring the pressure-sensitive adhesive layer to the film by using the peeling base, aging it, and then curing it.

In the process of forming the pressure-sensitive adhesive layer, if the pressure-sensitive adhesive composition includes a crosslinking agent, it is preferable that the crosslinking agent is controlled not to perform the crosslinking reaction of the functional group at the pressure-sensitive adhesive layer formation stage for uniform coating. That is, the crosslinking enhances cohesive strength and the pressure-sensitive adhesive physical property and cuttability of a product by forming the crosslinking structure during drying and aging processes after coating. In the present invention, it is desirable to perform the process of forming the pressure-sensitive adhesive layer after a volatile component or a bubble inducing component such as a reaction residue in the pressure-sensitive adhesive composition or coating liquid is sufficiently removed. If the modulus of elasticity decreases due to excessively low crosslinking density or molecular weight, small bubbles existing between the glass plate and the pressure-sensitive adhesive layer grow big, forming scatters in the pressure-sensitive adhesive composition. A method of curing the pressure-sensitive adhesive composition during preparation of the pressure-sensitive adhesive layer is not particularly limited, and for example, may be performed by applying proper heat or activating energy rays (e.g., UVs or electronic rays) to the pressure-sensitive adhesive composition.

The thickness of the formed pressure-sensitive adhesive layer is not specifically limited, and may be properly selected according to the application of the protective film.

In the present invention, the formed pressure-sensitive adhesive may include gel in a content of preferably 30 to 99%, more preferably 40 to 99% as below.

Gel Content (%)=$B/A$×100, [General Formula 4]

where A represents a weight of a pressure-sensitive adhesive, and B represents a dry weight of an undissolved part of the pressure-sensitive adhesive after immersing the pressure-sensitive adhesive in ethyl acetate at room temperature for 72 hours.

If the gel content is less than 30%, the endurance reliability of the pressure-sensitive adhesive in a high temperature and/or high humidity condition may be degraded. If the gel content exceeds 99%, the stress relaxing feature of the pressure-sensitive adhesive may be deteriorated.

The present invention also relates to a polarizer including a polarizing film or polarizing element and a protective film according to the present invention, which is formed on a face or both faces of the polarizing film or polarizing element.

A type of the polarizing film or polarizing element forming the polarizer is not specifically limited. For example, in the present invention, as the polarizing film or polarizing element, a film prepared by adding a polarization component such as iodine or dichroic dyes onto a polyvinyl alcohol resin film and elongating it may be used. The degree of polymerization of the polyvinyl alcohol resin may be 100 to 5,000, preferably 1,400 to 4,000. The thickness of the polarizing film can be properly selected according to the use of the LCD, and conventionally, the polarizing film is formed in a thickness of, but not limited to, 5 to 80 μm.

A method of attaching the protective film according to the present invention to the polarizing film or polarizing element is not specifically limited, and for example, the protective film may be attached by using a well-known adhesive means such as a polyvinyl alcohol adhesive including polyvinyl alcohol resin and a crosslinking agent or by using the pressure-sensitive adhesive composition according to the present invention.

The polarizer may further include one or more functional layers selected from a group consisting of a protective layer, a reflective layer, an anti-glare layer, a phase retardation plate, a compensation film for wide view angle, and a brightness enhancing film.

The present invention also relates to a liquid crystal display (LCD) including a liquid crystal panel in which the polarizer according to the present invention is attached on a face or both faces of a liquid crystal cell.

A type of a liquid crystal cell forming the LCD according to the present invention is not specifically limited, and includes a general liquid crystal cell such as of a twisted neumatic (TN) type, a super twisted neumatic (STN) type, or a vertical alignment (VA) type. The applications of the LCD according to the present invention may include, but not limited to, display devices or monitors of large-size TVs or monitors of desktops.

As long as the LCD according to the present invention includes the polarizer according to the present invention, a type of and a manufacturing method for other structures included in the LCD are not specially limited, either, and a general structure in this field can be adopted without limit.

EMBODIMENTS

Hereinafter, the present invention will be described in more detail with reference to examples according to the present invention and comparative examples which do not accord to the present invention, but the scope of the present invention is not limited by the examples to be described below.

Preparation Example 1. Preparation of Acrylic Copolymer A-1

To a 1 L reactor refluxed with nitrogen gas and equipped with a cooling system for easy regulation of temperature, a monomer mixture comprising 95.8 parts by weight of n-butyl acrylate (n-BA), 4 parts by weight of acrylic acid (AA), and 0.2 part by weight of hydroxyethyl methacrylate (2-HEMA) was added. Thereafter, 100 parts by weight of ethylacetate (EAc) was added as a solvent. The mixture was purged for 1 hour with nitrogen gas to remove oxygen and the temperature was kept at 62° C. Thereafter, the mixture was evenly mixed and 0.03 part by weight of azobisisobutyl-ronitrile (AIBN) diluted in ethylacetate in a concentration of 50% was added as a reaction initiator, followed by 8-hr reaction, thereby preparing an acrylic copolymer A-1.

Preparation Example 2. Preparation of Acrylic Copolymers A-2 to B-1

Except that the composition shown in Table 1 is adopted, acrylic copolymers were prepared in the same manner as in Preparation Example 1.

TABLE 1

| | Acrylic Resin | | | | |
|---|---|---|---|---|---|
| | A-1 | A-2 | A-3 | A-4 | A-5 |
| n-BA | 95.8 | 88.2 | 73.4 | 85.7 | 78.0 |
| EA | — | — | 25.1 | — | — |
| BzA | — | — | — | 13.1 | — |
| PhEA | — | 9.8 | — | — | 20.0 |
| AA | 4.0 | — | — | 1.2 | — |
| 2-HEMA | 0.2 | 2.0 | 1.5 | — | 2.0 |
| AIBN | 0.03 | 0.03 | 0.03 | 0.03 | 0.03 |
| $M_w$ (×1000) | 180 | 180 | 100 | 180 | 180 | n-BA: n-butyl acrylate
EA: ethyl acrylate
BzA: benzyl acrylate
PhEA: phenoxyethyl acrylate
AA: Acrylic Acid
2-HEMA: 2-hydroxyethyl methacrylate
$M_w$: Weight average molecular weight Example 1

Preparation of Pressure-Sensitive Adhesive Composition 100 parts by weight of the acrylic copolymer A-1, 0.5 part by weight of a trimethylolpropane-tolylenediisocyanate adduct (TDI-1) as a crosslinking agent, and 5 parts by weight of a compound expressed by Formula (1) as a compound having a positive stress optical coefficient were added, diluted in a proper concentration, and evenly mixed, after which it was coated to a peeling sheet and then dried, thereby preparing an even pressure-sensitive adhesive layer having a thickness of 25 μm.

[Formula (1)]

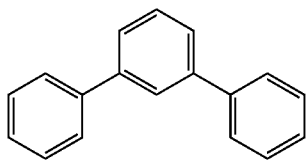 [SMILES: c1ccc(-c2cccc(-c3ccccc3)c2)cc1]

Preparation of Pressure-Sensitive Adhesive Polarizer

The prepared pressure-sensitive adhesive layer was applied to a face of a polarizer to which an acrylic protective film having a stress optical coefficient of 1.35 brewster was applied. The obtained polarizer was cut into a proper size for use in evaluation.

Examples 2 to 6 and Comparative Examples 1 to 4

Except that the composition of the pressure-sensitive adhesive composition was changed as shown in Table 2, the pressure-sensitive adhesive polarizer was prepared in the same manner as in Example 1. Detailed types of Compounds 1 to 4 having a positive stress optical coefficient, used in Examples and Comparative Examples, were shown below.

After physical properties were measured for prepared Examples and Comparative Examples in the following manner, the results were shown in Table 3.

1. Evaluation of Phase Retardation of Pressure-Sensitive Adhesive

The prepared pressure-sensitive adhesive was adhered between two glass plates with an adhesive area of 10 mm (width)×20 mm (length), thereby preparing specimens. The prepared specimens were elongated by deformation amounts of 500 μm and 600 μm respectively in a longitudinal direction at 23° C., by using a tensile tester, and then generated phase retardations ($R_{in}$) were measured. The phase retardations ($R_{in}$) were calculated as below.

$$R_{in}=(n_x-n_y)\times d,$$ [General Formula 1]

where $R_{in}$ indicates a phase retardation in surface-direction, $n_x$ indicates a refractive index along an x axis (horizontal axis) in the surface direction of the pressure-sensitive adhesive layer, $n_y$ indicates a refractive index along a y axis (vertical axis) in the surface direction of the pressure-sensitive adhesive layer, and d indicates the thickness of the pressure-sensitive adhesive layer.

TABLE 2

|  |  | Examples |  |  |  |  |  | Comparative Examples |  |  |  |
|---|---|---|---|---|---|---|---|---|---|---|---|
|  |  | 1 | 2 | 3 | 4 | 5 | 6 | 1 | 2 | 3 | 4 |
| Acrylic | A-1 | 100 | — | — | — | — | 100 | — | 100 | — | — |
| Copolymer | A-2 | — | — | 100 | — | — | — | — | — | — | 100 |
|  | A-3 | — | 100 | — | 100 | — | — | 100 | — | — | — |
|  | A-4 | — | — | — | — | 100 | — | — | — | — | — |
|  | B-1 | — | — | — | — | — | — | — | — | 100 | — |
| Crosslinking Agent |  | 0.5 | 0.5 | 0.5 | 0.5 | 0.5 | 0.5 | 0.5 | 0.5 | 0.5 | 0.5 |
| Formula (1) |  | 5 | — | — | — | — | — | — | — | — | — |
| Formula (2) |  | — | 8 | — | — | — | — | — | — | — | 30 |
| Formula (3) |  | — | — | — | — | — | 1 | — | — | — | — |
| Formula (4) |  | — | — | — | 10 | — | 7 | — | 20 | — | — |

[Formula (1)]

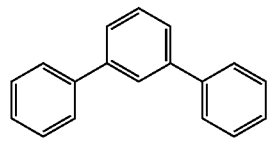

[Formula (2)]

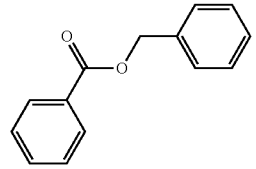 [SMILES: O=C(OCc1ccccc1)c1ccccc1]

[Formula (3)]

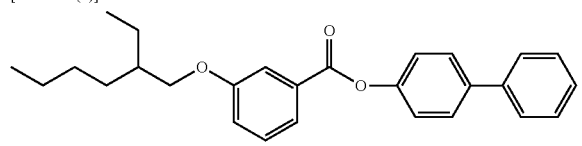

[Formula (4)]

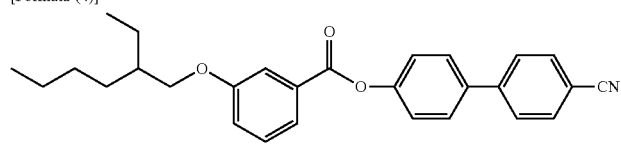

2. Evaluation of Endurance Reliability

A polarizer (90 mm×170 mm) to which pressure-sensitive adhesives prepared in Examples and Comparative Examples were applied was attached to both faces of a glass substrate (110 mm×190 mm×0.7 mm), with each optical absorbing axis crossed. The above process was carried out in a clean room in order to prevent bubbles or impurities generation, and the applied pressure for attachment was about 5 kg/cm². In order to evaluate moisture-heat resistance of the specimens, they were left at a temperature of 60° C. and a relative humidity of 90% for 1,000 hours and then observed about formation of bubbles or releases. For heat resistance of the specimens, they were left at a temperature of 80° C. for 1,000 hours and then observed about formation of bubbles or releases. The specimens were left at room temperature for 24 hours immediately before evaluation. The evaluation criteria for endurance reliability were as follows:

○: No bubble or release phenomenon was observed.

Δ: A few bubbles or release phenomenon occurred.

x: A large quantity of bubbles or release phenomenon occurred.

3. Evaluation of Light Transmission Uniformity (Light Leakage)

By using the same specimens as endurance reliability evaluation, the uniformity of light transmission was measured. The glass substrate was observed about whether light was leaked in a dark room by irradiating back light to the specimens. More specifically, the pressure-sensitive adhesive polarizer (400 mm×200 mm) was attached to both sides of the glass substrate (410 mm×210 mm×0.7 mm) with each optical axis being crossed, and then observed. The specimens used for light transmission uniformity evaluation was left at 60° C. for 500 hours or at 50° C. and 90% R.H for 500 hours, and then used at room temperature. The uniformity of light transmission was evaluated with the following criteria:

○: Non-uniformity phenomenon of light transmission was difficult to determine by the naked eye.

Δ: Some few non-uniformity phenomenon of light transmission was present.

x: A large quantity of non-uniformity phenomenon of light transmission was present.

TABLE 3

|  |  | Examples | | | | | | Comparative Examples | | | |
| --- | --- | --- | --- | --- | --- | --- | --- | --- | --- | --- | --- |
|  |  | 1 | 2 | 3 | 4 | 5 | 6 | 1 | 2 | 3 | 4 |
| Phase Retardation (nm) | 500 μm deformation | −0.2 | −0.45 | 0.21 | 0.32 | 0.45 | −0.12 | −3.76 | 2.78 | 2.57 | 3.21 |
|  | 600 μm deformation | −1.05 | −1.2 | 0.23 | 0.33 | 1.2 | −0.89 | −5.66 | 4.54 | 4.21 | 5.2 |
| Endurance Reliability |  | ○ | ○ | ○ | ○ | ○ | ○ | ○ | ○ | ○ | Δ |
| Uniformity of Light Transmission (Light Leakage) |  | ○ | ○ | ○ | ○ | ○ | ○ | x | x | x | x |

As can be seen from Table 3, Examples having a surface-direction phase retardation falling within the range according to the present invention were excellent in terms of both endurance reliability and uniformity of light transmission. However, in case of Examples having a surface-direction phase retardation, an absolute value of which exceeds 2 nm, the results of light transmission uniformity evaluation were especially poor, from which it is expected that a large mount of light leakage may occur in application to an LCD, causing significant performance degradation.

The invention claimed is:

1. A polarizer comprising:

a polarizing film or polarizing element; and a protective film attached to a side or both sides of the polarizing film or polarizing element, wherein the protective film comprises:

a base film, and a pressure sensitive adhesive layer on a side or both sides of the base film, wherein the pressure sensitive adhesive layer comprises a cured product of a pressure-sensitive adhesive composition satisfying a condition of General Formula 1 given below:

$$\Delta X \leq 2 \text{ nm},\quad [\text{General Formula 1}]$$

wherein $\Delta X$ represents an absolute value of a phase retardation ($R_{in}$) in a surface-direction, the phase retardation being measured by an equation, $R_{in} = \{(n_x - n_y) \times d\}$, when a sheet-shaped pressure-sensitive adhesive that has a width of 10 mm and a length of 20 mm and that is prepared by using the pressure-sensitive adhesive composition is elongated by 500 μm in a longitudinal direction at 23° C., wherein $n_x$ represents a refractive index along a horizontal axis in a surface of the sheet-shaped pressure-sensitive adhesive, $n_y$ represents a refractive index along a vertical axis in the surface of the sheet-shaped pressure-sensitive adhesive, and d represents a thickness of the sheet-shaped pressure-sensitive adhesive, wherein the base film is a saturated cycloolefin film; an olefin thermoplastic resin film having a substituted or unsubstituted imide group in its side chain; a thermoplastic resin film having a substituted or unsubstituted phenyl group and nitrile group in its side chain; or an acrylic film, wherein a stress optical coefficient of the saturated cycloolefin film; the olefin thermoplastic resin film having a substituted or unsubstituted imide group in its side chain; the thermoplastic resin film having a substituted or unsubstituted phenyl group and nitrile group in its side chain is 6 brewster or less, and the stress optical coefficient of the acrylic film is 3 brewster or less, and wherein the pressure sensitive adhesive composition comprises a compound having a positive stress optical coefficient expressed by Formula 3 or Formula 4:

[Formula 3]

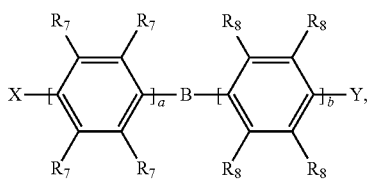

where B represents a single bond, —CH=N—, —N=N—, —N=N(O)—, —COO—, —CH$_2$O—, —C(R$_7$)$_2$—CO—, —COO—CH$_2$—, —CH=CH—, —C≡C—, —S—, —SO$_2$—, -φ(R$_7$)—, —CH=N-φ (R$_7$)—N=CH—, —CH=CH-φ(R$_7$)—N=CH—, —CH=CH-φ(R$_7$)—CH=CH—, —CH=CH-φ(R$_7$)-φ (R$_8$)—CH=CH—, —CH=N-φ(R$_7$)(R$_8$)—N=CH—, —CH=N-φ(R$_7$)-φ(R$_8$)—CH=CH—, —N=N-φ (R$_7$)—N=CH—, —C(=O)—O-φ(R$_7$)—C(CH$_3$)$_2$—, a naphthalene core, or an anthracene core, X, Y, R$_7$, and R$_8$ represent independently hydrogen, halogen, cyano, amino, hydroxy, alkyl, alkoxy, aryl, dialkylamine, and cumyl, a represents an integer of 0 to 3, and b represents an integer of 1 to 3 when a is 0, and an integer of 0 to 3 when a is an integer of 1 to 3,

[Formula 4]

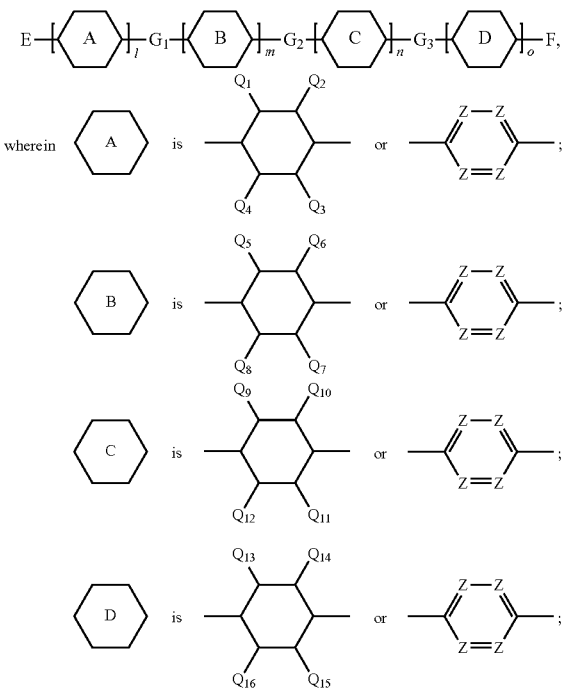

Z is C—W or N;
Q$_1$ to Q$_{16}$ and W are independently hydrogen, halogen, cyano, perfluoroalkyl, perfluoroalkyloxy, —R$_9$, —OR$_9$, —NHR$_9$, —N(R$_9$)$_2$, —C(=O)R$_9$, —SR$_9$, —SOR$_9$, —SO$_2$R$_9$, —C(=O)NR$_9$, —NR$_9$C(=O)R$_9$, —C(=O)OR$_9$, —OC(=O)R$_9$, or —OC(=O)OR$_9$;
R$_9$ is hydrogen, alkyl, alkenyl, alkynyl, or —(R$_{10}$O)$_q$R$_{11}$, R$_{10}$ is alkylene, R$_{11}$ is alkyl, and q is an integer of 1 to 5;
l, m, n, and o are independently an integer of 0 to 2, and l+m+n+o is an integer greater than 2;

E and F are independently hydrogen, halogen, cyano, —R$_9$, —OR$_9$, —NHR$_9$, —N(R$_9$)$_2$, —NCO, —NCS, —C(=O)R$_9$, or —Si(R$_{90}$)$_3$; and
G$_1$, G$_2$ and G$_3$, are independently a single bond, —O—, —R$_{10}$O—, —NR$_{10}$—, —S—, —SO—, —SO$_2$—, alkylene, alkenylene, alkynylene, or —U-T-V—, U and T are independently a single bond, —S—, —NR$_{10}$—, —O(CH$_2$)$_p$—, carbonyl or —O—, V is a single bond, —O—, carbonyl, —NR$_{10}$—, —S—, —(CH$_2$)$_p$—, —O(CH$_2$)$_p$—, or —(CH$_2$)$_p$O—, and p is an integer of 0 to 5.

2. The polarizer of claim 1, wherein the pressure-sensitive adhesive composition further comprises a base resin having a weight average molecular weight of 500,000 or more.

3. The polarizer of claim 2, wherein the base resin is a polymer of a monomer mixture comprising 80 to 99.8 parts by weight of a (meth)acrylic acid ester monomer; and 0.01 to 10 parts by weight of a crosslinking monomer.

4. The polarizer of claim 3, wherein the (meth)acrylic acid ester monomer is one or more selected from a group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, isobornyl (meth)acrylate, and tetradecyl (meth)acrylate.

5. The polarizer of claim 3, wherein the crosslinking monomer is one or more selected from a group consisting of a hydroxy group-containing monomer, a carboxyl group-containing monomer, and a nitrogen-containing monomer.

6. The polarizer of claim 3, wherein the monomer mixture further comprises a monomer expressed by:

[Formula 1]

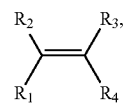

where R$_1$ to R$_3$ independently represent hydrogen or alkyl, and R$_4$ represents cyano; phenyl unsubstituted or substituted with alkyl; acetyloxy; or COR$_5$, in which R$_5$ represents glycidyloxy or amino unsubstituted or substituted with alkyl or alkoxy alkyl.

7. The polarizer of claim 3, wherein the monomer mixture further comprises a compound expressed by:

[Formula 2]

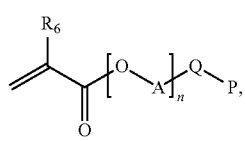

where R$_6$ represents hydrogen or alkyl, A represents an alkylene, n represents an integer of 0 to 3, Q represents a single bond, —O—, —S—, or an alkylene, and P represents a substituted or unsubstituted aromatic group.

8. The polarizer of claim 2, wherein the pressure sensitive adhesive composition further comprises 0.1 to 10 parts by weight of a crosslinking agent relative to 100 parts by weight of the base resin.

9. The polarizer of claim 8, wherein the crosslinking agent is one or more selected from a group consisting of an isocyanate compound, an epoxy compound, an aziridine compound, and a metal chelate compound.

10. The polarizer of claim 2, wherein the pressure-sensitive adhesive composition further comprises 0.01 to 10 parts by weight of a silane coupling agent relative to 100 parts by weight of the base resin.

11. The polarizer of claim 1, wherein the acrylic film comprises an acrylic resin; and a graft copolymer containing a conjugated diene rubber.

12. The polarizer of claim 1, further comprising one or more selected from a group consisting of a protective layer, a reflective layer, an anti-glare layer, a phase retardation film, a compensation film for wide view angle, and a brightness enhancement film.

13. A liquid crystal display comprising a liquid crystal panel in which the polarizer according to claim 1 is attached on a face or both faces of a liquid crystal cell.

14. The polarizer of claim 1, wherein the ΔX of the General Formula 1 is 1.5 nm or less.

15. The polarizer of claim 1, wherein the ΔX of the General Formula 1 is 1 nm or less.

16. A polarizer comprising:
a polarizing film or polarizing element; and
a protective film attached to a side or both sides of the polarizing film or polarizing element,
wherein the protective film comprises:
a base film disposed on the polarizing film or polarizing element, and
a pressure sensitive adhesive layer disposed on a side of the base film opposite to the polarizing film or polarizing element,
wherein the pressure sensitive adhesive layer is a cured product of a pressure-sensitive adhesive composition satisfying a condition of General Formula 1 given below:

ΔX≤2 nm,  [General Formula 1]

wherein ΔX represents an absolute value of a phase retardation ($R_{in}$) in a surface-direction, the phase retardation being measured by an equation, $R_{in}=\{(n_x-n_y)\times d\}$, when a sheet-shaped pressure-sensitive adhesive that has a width of 10 mm and a length of 20 mm and that is prepared by using the pressure-sensitive adhesive composition is elongated by 500 μm in a longitudinal direction at 23° C., wherein $n_x$ represents a refractive index along a horizontal axis in a surface of the sheet-shaped pressure-sensitive adhesive, $n_y$ represents a refractive index along a vertical axis in the surface of the sheet-shaped pressure-sensitive adhesive, and d represents a thickness of the sheet-shaped pressure-sensitive adhesive, wherein the base film is a saturated cycloolefine film, an olefine thermoplastic resin film having a substituted or unsubstituted imide group in its side chain; a thermoplastic resin film having a substituted or unsubstituted phenyl group and nitrile group in its side chain; or an acrylic film, wherein a stress optical coefficient of the saturated cycloolefine film, the olefine thermoplastic resin film having a substituted or unsubstituted imide group in its side chain; or the thermoplastic resin film having a substituted or unsubstituted phenyl group and nitrile group in its side chain is 6 brewster or less and a stress optical coefficient of the acrylic film is 3 brewster or less, wherein the pressure-sensitive adhesive composition comprises: a base resin that is a polymer of a monomer mixture including a (meth)acrylic acid ester monomer, a crosslinking monomer and a compound expressed by Formula 2 given below; and a crosslinking agent crosslinking the base resin:

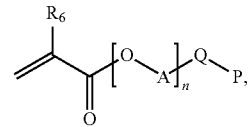

[Formula 2]

where $R_6$ represents hydrogen or alkyl, A represents an alkylene, n represents an integer of 0 to 3, Q represents a single bond, —O—, —S—, or an alkylene, and P represents a substituted or unsubstituted aromatic group, and wherein the crosslinking agent is one or more selected from the group consisting of an isocyanate compound, an epoxy compound, an aziridine compound, and a metal chelate compound.

17. The polarizer of claim 16, wherein the protective film comprises only one base film.

* * * * *